(12) United States Patent
Franz

(10) Patent No.: US 6,438,309 B1
(45) Date of Patent: Aug. 20, 2002

(54) CABLE ORGANIZER AND METHOD

(75) Inventor: Perry D. Franz, Elk Mound, WI (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/475,812

(22) Filed: Dec. 30, 1999

Related U.S. Application Data

(63) Continuation-in-part of application No. 09/408,148, filed on Sep. 29, 1999.

(51) Int. Cl.$^7$ .................................................. G02B 6/00
(52) U.S. Cl. ........................................ 385/135; 361/727
(58) Field of Search ................................ 385/135, 137; 248/49, 65; 211/26; 361/724, 727; 312/294

(56) References Cited

U.S. PATENT DOCUMENTS

| | | | |
|---|---|---|---|
| 2,531,110 A | 11/1950 | Cisler | 174/52 |
| 3,657,608 A | 4/1972 | Leone et al. | 317/118 |
| 3,677,615 A | 7/1972 | Hudson | 312/346 |
| 4,442,476 A | 4/1984 | Lenderking et al. | 361/395 |
| 4,535,703 A | 8/1985 | Henriott et al. | 108/50 |
| 4,892,489 A | 1/1990 | Hirai | 439/497 |
| 5,027,257 A | 6/1991 | Lockwood et al. | 361/428 |
| 5,049,701 A | 9/1991 | Vowles et al. | 174/35 R |
| 5,142,442 A | 8/1992 | Daniels et al. | 361/384 |
| 5,154,126 A | 10/1992 | Newhouse et al. | 108/50 |
| 5,165,770 A | 11/1992 | Hahn | 312/265.4 |
| 5,209,356 A | 5/1993 | Chaffee | 211/26 |
| 5,238,418 A | 8/1993 | Koiner | 439/157 |
| 5,275,494 A | 1/1994 | Petracca et al. | 400/83 |
| 5,277,131 A | 1/1994 | Fortsch | 108/50 |
| 5,291,368 A | 3/1994 | Conroy-Wass | 361/796 |
| 5,331,508 A | 7/1994 | Hosoi et al. | 361/680 |
| 5,339,221 A | 8/1994 | Conroy-Wass et al. | 361/796 |
| 5,355,278 A | 10/1994 | Hosoi et al. | 361/680 |
| 5,385,870 A | 1/1995 | Maue et al. | 439/157 |
| 5,559,922 A * | 9/1996 | Arnett | 385/135 |
| 5,568,362 A | 10/1996 | Hansson | 361/736 |
| 5,571,256 A | 11/1996 | Good et al. | 211/26 |
| 5,574,251 A | 11/1996 | Sevier | 174/50 |
| 5,586,003 A | 12/1996 | Schmitt et al. | 361/683 |
| 5,586,012 A | 12/1996 | Lerman | 361/826 |
| 5,611,708 A * | 3/1997 | Mizunuma et al. | 439/358 |
| 5,618,091 A | 4/1997 | Huber et al. | 312/348.1 |
| 5,654,873 A | 8/1997 | Smithson et al. | 361/685 |
| 5,666,271 A | 9/1997 | Kim et al. | 361/726 |
| 5,673,632 A | 10/1997 | Sykes | 108/121 |
| 5,690,403 A | 11/1997 | Ellison et al. | 312/223.6 |
| 5,724,469 A * | 3/1998 | Orlando | 385/135 |
| 5,761,033 A | 6/1998 | Wilhelm | 361/686 |
| 5,788,087 A | 8/1998 | Orlando | 211/26 |
| 5,803,770 A | 9/1998 | Swendson et al. | 439/676 |
| 5,823,650 A | 10/1998 | Lin | 312/348.1 |
| 5,896,273 A | 4/1999 | Varghese et al. | 361/724 |
| 5,975,735 A | 11/1999 | Schmitt | 364/131 |
| 6,009,224 A * | 12/1999 | Allen | 385/135 |
| 6,016,252 A | 1/2000 | Pignolet et al. | 361/724 |
| 6,021,909 A | 2/2000 | Tang et al. | 211/183 |
| 6,081,644 A * | 6/2000 | Stateczny et al. | 385/135 |
| 6,088,222 A | 7/2000 | Schmitt et al. | 361/686 |
| 6,095,345 A | 8/2000 | Gibbons | 211/26 |
| 6,129,429 A | 10/2000 | Hardt et al. | 312/223.2 |
| 6,259,605 B1 | 7/2001 | Schmitt | 361/727 |
| 6,279,754 B1 | 8/2001 | Hoss et al. | 211/26 |
| 6,123,203 A1 | 9/2001 | Gibbons | 211/26 |

* cited by examiner

*Primary Examiner*—Cassandra Spyrou
*Assistant Examiner*—Euncha Cherry
(74) *Attorney, Agent, or Firm*—Schwegman, Lundberg, Woessner & Kluth, P.A.

(57) ABSTRACT

A cable organizer having a mounting mechanism suitable for mounting the cable organizer on a structure, at least one compartment for retaining at least one cable and a snap mechanism for use in installing the cable within the compartment.

8 Claims, 6 Drawing Sheets

CABLE ORGANIZER AND METHOD

RELATED APPLICATIONS

This application is a continuation-in-part of U.S. patent application Ser. No. 09/408,148, filed Sep. 29, 1999.

FIELD OF INVENTION

This invention relates to electronic hardware, and in particular to a cable organizer and method.

BACKGROUND

Commercial use computer systems typically include computer modules resting on a special sub-floor allowing for cable routing and grounding beneath the floor surface. In some cases, computer modules are placed in commercial computer racks resting on the sub-floor.

Achieving higher CPU density using these computer modules as building blocks is inhibited, in part, by a number of factors related to the configuration of these elements. One factor is the need for extensive cable connections which can result in a cable system that is difficult to manage and support. Cables have traditionally been left unorganized. Extensive cable connections can inhibit the ease of installation, service, upgrade and scalability of computer systems. Installation, service and upgrade of a computer system can be a protracted and cumbersome process, even ancillary cables must often be disconnected from the system to access a computer module or other cables connected to the computer module. Often cables must be repositioned using ad hoc means during installation, service, and upgrade.

Service and upgrade of computer systems also typically requires removal of a computer module from a rack after disconnection of cables. When a computer system is scaled or reconfigured and a module is instead exchanged for another module of a different size, the it may be necessary to rearrange other modules in the rack to accommodate the larger or smaller module, extensive cable connections may have to be detached from the modules and then reconnected to the modules in their new configuration.

Furthermore, in the case of commercial computer systems rerouting of cables underneath a sub-floor is another common requirement of commercial systems. In some cases this may require extensive removal and re-assembly of additional portions of sub-floor. Another problem is access to portions of the computer system. Accessing portions cases this may require extensive removal and re-assembly of additional portions of sub-floor.

Another problem is access to portions of the computer system. Accessing portions of the computer system typically requires accessing a number of discrete modules. Modules will typically be positioned within racks providing poor access to the module. Poor access to the module is due in part to ad hoc arrangement of cables connected to the modules. This can slow the installation, service, and upgrade processes making larger systems from these components less desirable. This is also one cause of poor field serviceability. Proper positioning, grounding and servicing of modules is often either not done, poorly done, or is improperly done.

A need exists for improving the ease with which cables are managed.

SUMMARY OF THE INVENTION

The present invention addresses the above described deficiencies in cable management and provides for an apparatus and method for managing cables.

According to one aspect of the present invention, a cable organizer includes a mounting mechanism suitable for removably mounting the cable organizer on a structure, at least one compartment for retaining at least one cable and a snap mechanism for use in installing the cable within the compartment.

According to one aspect of the present invention, a cable organizer includes a mounting mechanism suitable for removably mounting the cable organizer on a structure, at least one compartment for retaining at least on cable and a set of arms defining at least a portion of the compartment, the set of arms crossing one in front of the other and having a space there between to allow for the cable to be manually guided through the set of arms into the compartment, the arms crossing one in front of the other such that the cable is retained within the compartment.

According to one aspect of the invention, a method for using a cable organizer having a mounting mechanism for removably mounting the cable organizer on a structure, at least one compartment for retaining at least one cable and a snap mechanism for use in installing the cable within the compartment includes the steps of providing a rack, mounting the cable organizer on the rack, removably installing a cable into a compartment of the cable organizer.

DESCRIPTION OF EMBODIMENTS

In the following detailed description of the preferred embodiments, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
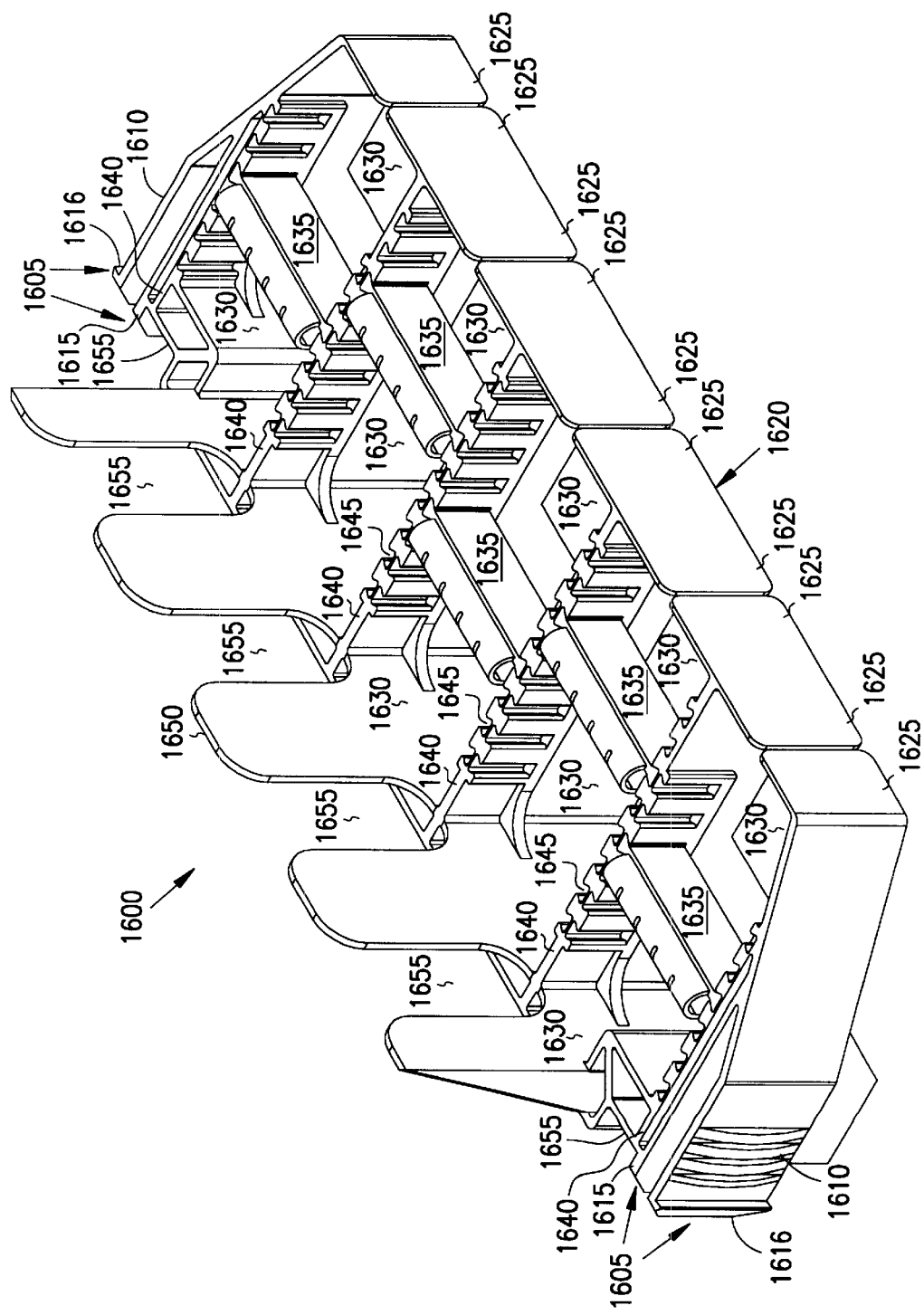
FIG. 1 is a view of an embodiment of a cable organizer bracket.
Figure 2:
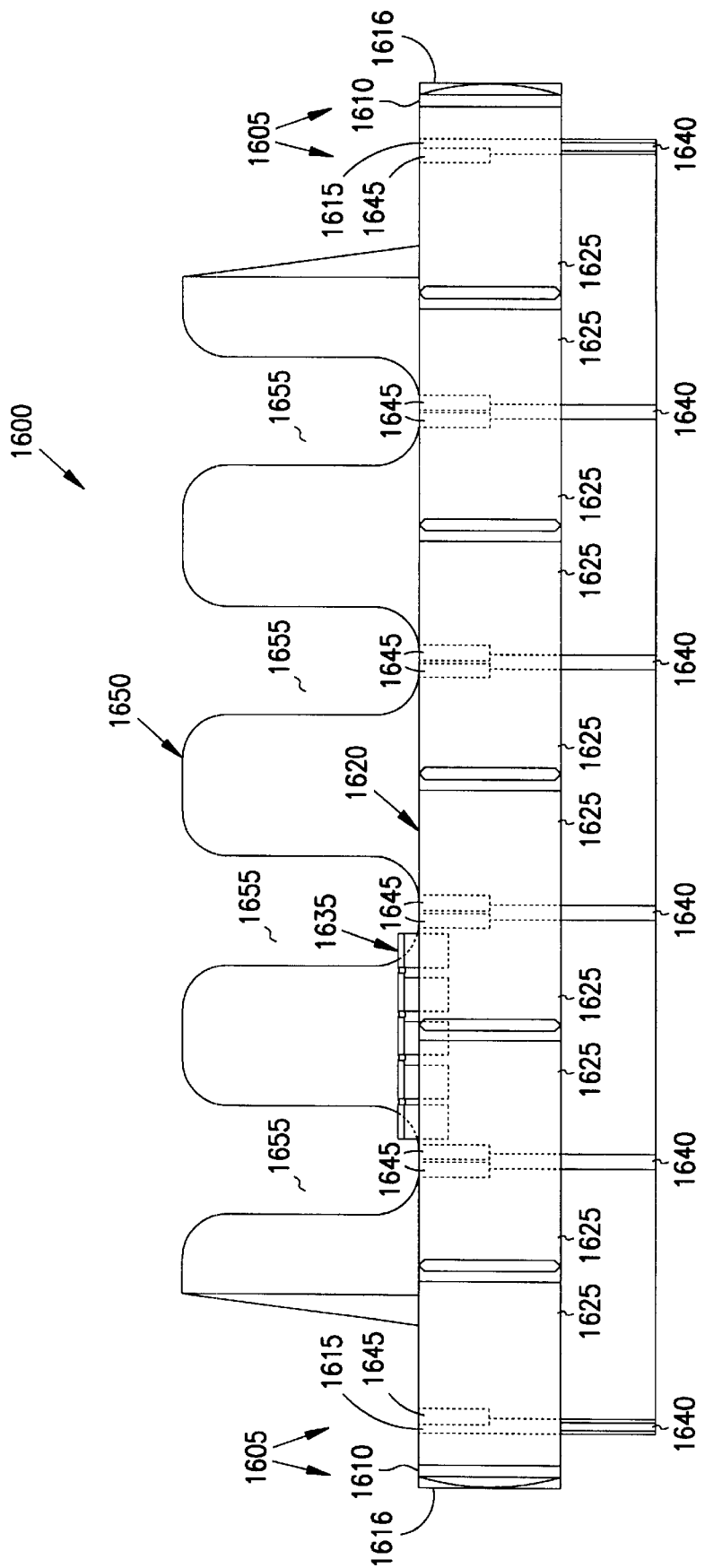
FIG. 2 is a view of an embodiment of a cable organizer bracket.
Figure 3:
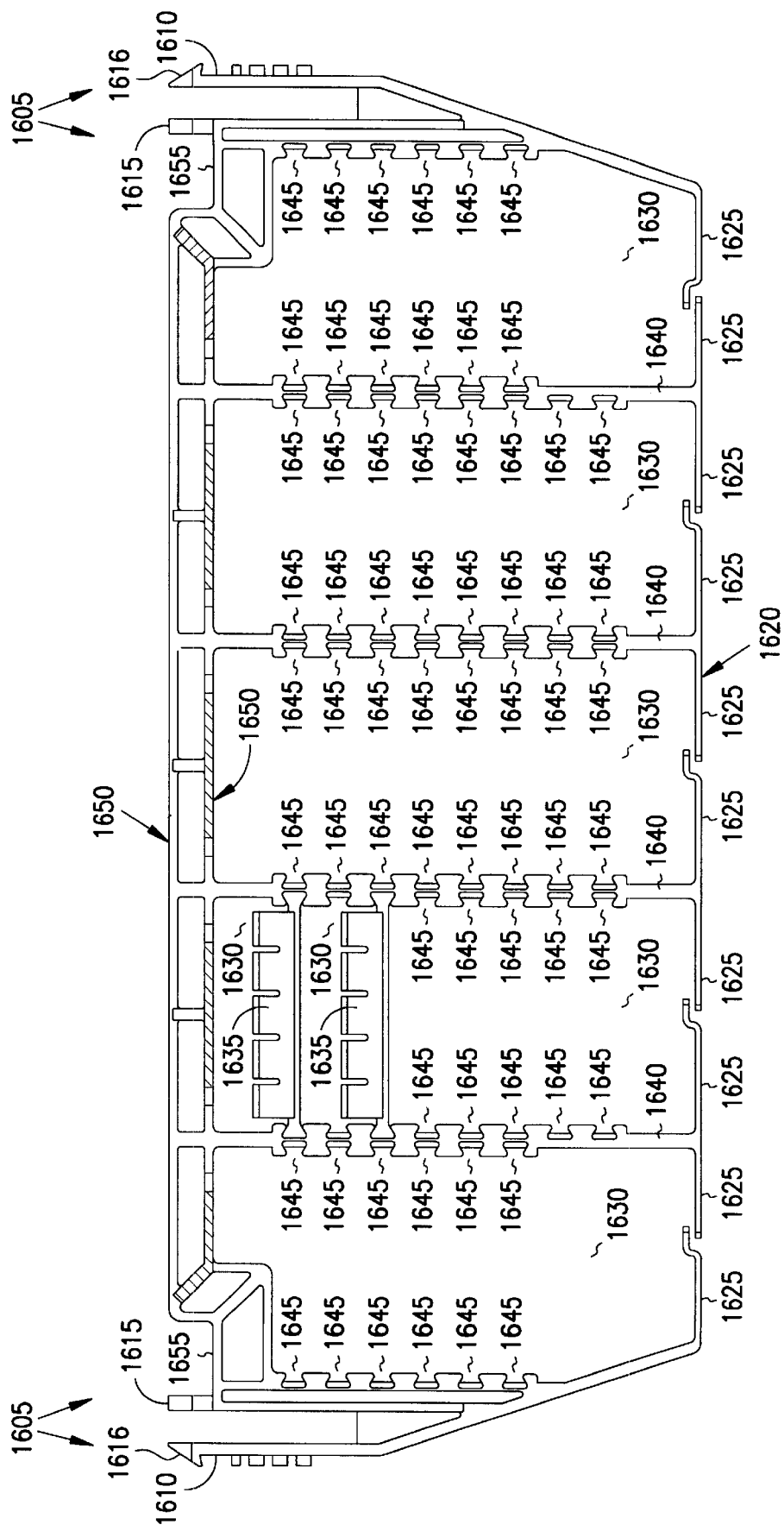
FIG. 3 is a view of an embodiment of a cable organizer bracket.
Figure 4:
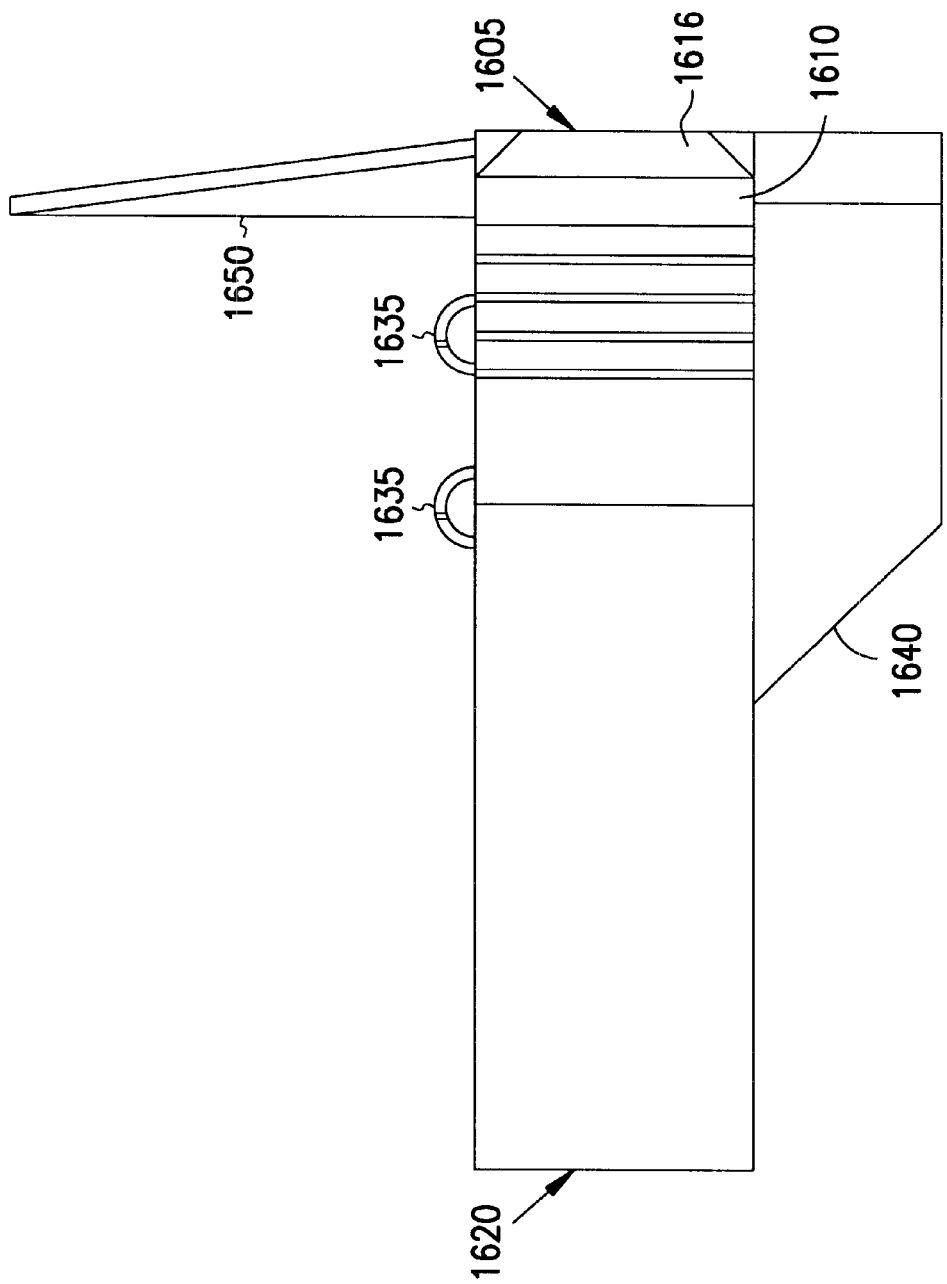
FIG. 4 is a view of an embodiment of a cable organizer bracket.
Figure 5:
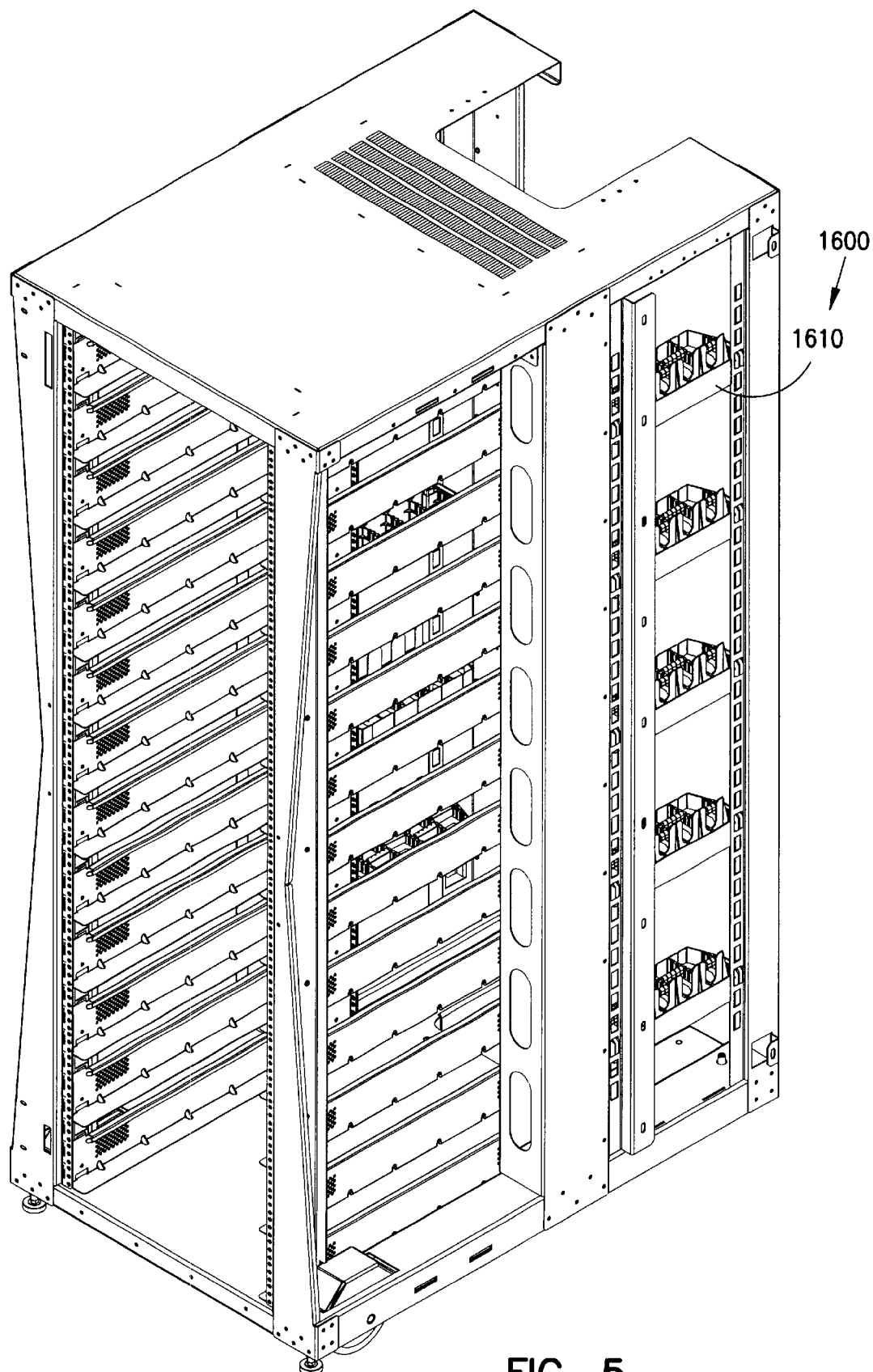
FIG. 5 is a view of an embodiment of a structure having a plurality of cable organizers.
Figure 6:
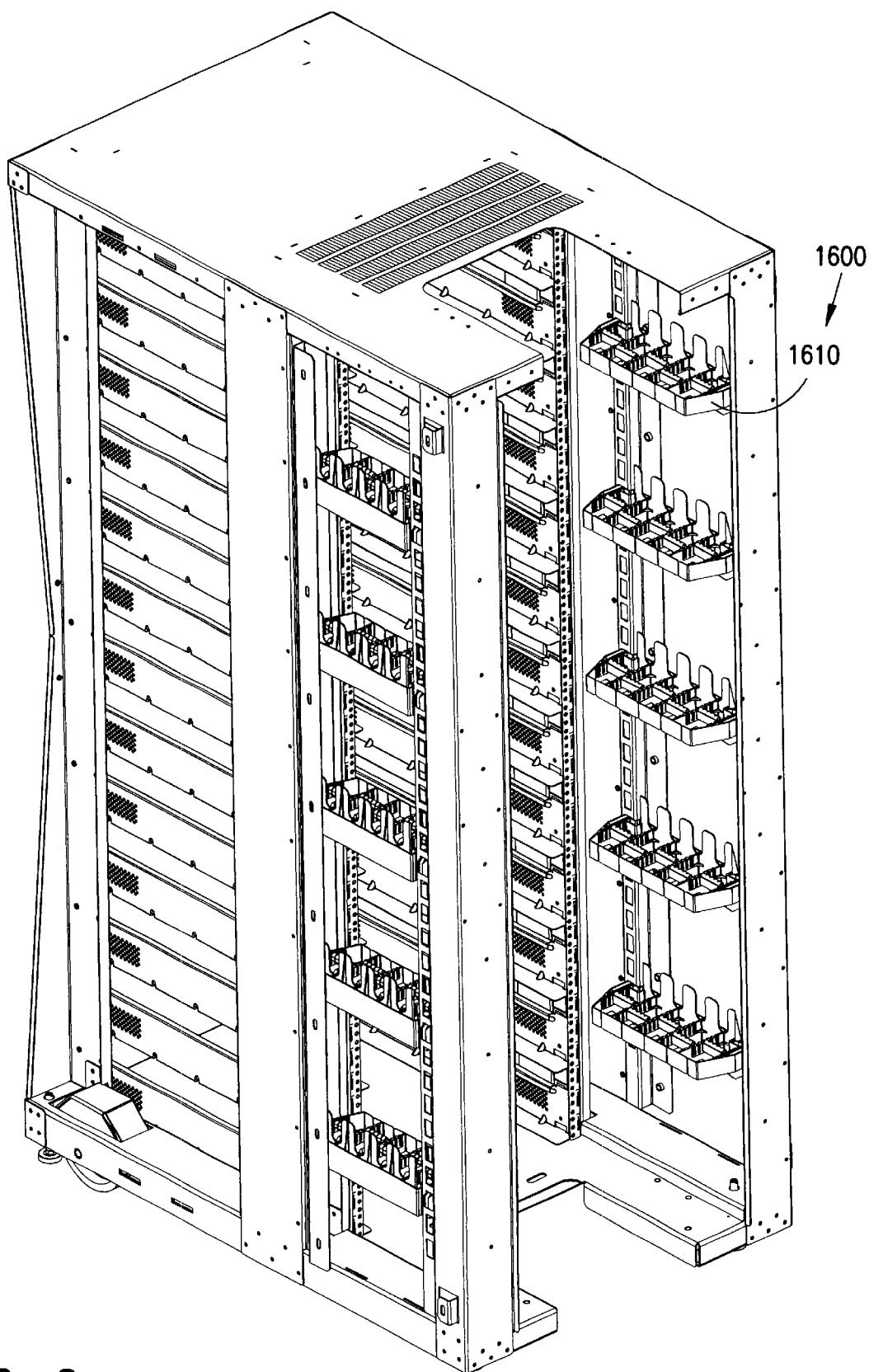
FIG. 6 is a view of an embodiment of a structure having a plurality of cable organizers.

FIGS. 1, 2, 3, and 4 illustrate a cable organizer 1600 comprised of a cable organizer bracket 1610 with a mounting mechanism that includes arms 1605 for installing into the cable organizer apertures on a structure. FIGS. 5 and 6 illustrate an embodiment of a plurality of cable organizers 1600 mounted on a structure. In one embodiment, the cable organizer bracket 1610 includes arms 1605 that deflect toward one another upon installation, then spring to provide an interference fit against the edge of cable organizer apertures which receive the mounting mechanism on the structure. In one embodiment, the cable organizer bracket 1610 includes a mounting mechanism for removably mounting the cable organizer bracket 1610 on a structure. In one embodiment, the cable organizer bracket 1610 can be adjusted to various positions on a structure such as along the length of a computer rack or cabinet by mounting the cable organizer bracket 1610 on a series of cable organizer apertures running the length of the rack or running the length of the cabinet. This is especially advantageous where computer modules have adjustable positions within a rack as the cable organizer bracket 1610 can be repositioned within the rack to locations where cable management is needed. In one embodiment, arm 1610 is designed to be more flexible than arm 1615 and includes a lead in portion 1616 to aid installation of the cable organizer 1600 to the structure. Contact between the edge of the aperture and the lead in portion 1616 causes arm 1610 to deflect until the lead in portion 1616 passes through the aperture and the arm 1610 snaps out so that arms 1610 and 1615 maintain an interference fit against the edges of the aperture. Once installed, the lead in portion 1616 acts as a stop on one side of the structure having the apertures, a back portion 1655 of the back face 1650 of the cable organizer bracket 1610 acts as a stop on the other side of the structure having the apertures.

In one embodiment, the cable organizer bracket 1610 includes a front portion for receiving the cable, the front portion 1620 having arms 1625 deflecting into the cavity 1630 to create a passage for the cable to enter, then returning to their original position once the cable is placed within the cavity 1630. In one embodiment, the cable organizer 1600 includes a snap mechanism for us in installing the cable within the compartment 1630. In another embodiment the cable organizer bracket 1610 includes a divider or cable separator 1635 for providing adjustable compartment 1630 sizes and for separating cables. In one embodiment, the cable organizer bracket 1610 includes a compartment 1630 for retaining at least one cable routed at least in part in a substantially vertical direction. In one embodiment, the divider 1635 is positioned using grooves 1645 extending down a portion of the wall 1640 that defines at least part of the cavity 1630. In one embodiment a plurality of grooves 1645 are arranged to provide for adjustment of the divider 1635 to various positions within the cavity 1630. In one embodiment, the sides of each groove 1645 are angled inward to match the shape of the portion of the divider 1635 fitting within the groove 1645. This helps to align the divider 1635 during installation and maintain the position of the divider 1635. In another embodiment, the portion of the divider 1635 fitting within the groove maintains a snug fit with the groove 1645 to prevent inadvertent removal of the divider 1635 when reconfiguring the cables supported within the cable organizer bracket 1610.

Furthermore, use of a cable organizer 1600 for cable management is especially advantageous where cable density is increased. As computer systems are scaled to larger systems, cable density increases and the need for cable management increases. In one embodiment, the cable organizer 1600 includes compartments 1630 for storing multiple cables. In another embodiment, the cable organizer 1600 supports a portion of the weight of the cable or cables positioned inside. This is advantageous in that the weight of cables used in the industry has increased and may continue to increase. Providing support to the cables can reduce the bending forces imparted on the components at the connection to the cable and can help to maintain the integrity of the connection.

In one embodiment, a cable organizer 1600 can be used within a computer rack for positioning cables away from computer modules so that computer modules or removable portions of computer modules can be more easily and quickly accessed. A hot swappable PCI card such as is described in U.S. application Ser. No. 09/408,657 Method and Assembly for Installation or Removal of Printed Circuit Card is one such example. In another embodiment, the cable organizer 1600 is suitable for being placed proximal a passage in a first rack to maintain placement of cables routed through the passage. In one embodiment, a cable organizer 1600 is used in a second rack for receiving cables routed through a passage in the first rack, and through a passage in the second rack. In one embodiment, the cable organizer 1600 includes at least one compartment 1655 for retaining at least one cable routed at least in part in a substantially horizontal direction.

The cable organizer 1600 can include a variety of means for retaining the cable. In one embodiment, the cable organizer 1600 includes a flexible portion with a Velcro type closure for retaining the cable. In another embodiment, the cable organizer 1600 has a C-shaped cross section defining a circular cavity for receiving the cable. The organizer 1600 can include flanges for contacting the cable upon installation into the organizer 1600, the force of the cable on the flanges causing the C-shaped cross section to snap open and then close once the cable is inside the cavity. In yet another embodiment, the cable organizer 1600 can have a cavity for receiving the cable defined by a set of arms extending straight out from the rear of the organizer then crossing one in front of the other with space between the arms for inserting the cable, the cable is then manually guided to the cavity behind the arms. In one embodiment, the cable organizer 1600 extends downward to control the position of the cable along a portion of the length of the cable. In one embodiment, the cable organizer 1600 is manufactured with plastic material. In one embodiment, the cable organizer 1600 is manufactured with ABS. In one embodiment, the cable organizer 1600 is manufactured with reinforced resin. In one embodiment, the cable organizer 1600 is manufactured to be lightweight material. In one embodiment, the cable organizer is manufactured to be electrically insulative. In one embodiment, the cable organizer 1600 is manufactured of a material capable of withstanding high temperatures. In one embodiment, the cable organizer 1600 is manufactured of a material capable of withstanding temperatures reached by commercial computer systems. In one embodiment. the cable organizer 1600 is manufactured with metal.

Use of electronics continues to increase. The various embodiments relate to a cable organizer 1600 that is capable of use with large and small cables in a variety of electronic applications including but not limited to: commercial computer systems, personal computer systems, commercial electronic systems, personal electronics, industrial equipment, vehicular systems and appliances. The cable organizer 1600 is suitable for mounting on a variety of structures or structural components including but not limited to: a computer rack, a support rail and a cabinet. The cable organizer 1600 can be mounted in any orientation and is capable of maintaining placement of cables in any orientation.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A cable organizer including:
    a mounting mechanism configured to removably mount the cable organizer on a structure;
    a compartment for retaining at least one cable from a device which is mountable on the structure; and a pair of arms located on a front portion of the compartment for use in retaining the cable within the compartment.

2. The cable organizer of claim 1, wherein the compartment is adapted for retaining the cable in a vertical direction relative to an orientation of the structure.

3. The cable organizer of claim 1, wherein the compartment is adapted for retaining the cable in a horizontal direction relative to an orientation of the structure.

4. The cable organizer of claim 1, including:
   a cable separator within the compartment.

5. The cable organizer of claim 4, wherein the cable separator is adjustable within the compartment to create compartments of varying size.

6. The cable organizer of claim 1, wherein the compartment is adapted for retaining a cable routed at least in part in a substantially vertical direction relative to the orientation of the structure and further including a second compartment adapted for retaining a second cable routed at least in part in a substantially horizontal direction relative to the orientation of the structure.

7. A cable organizer including:
   a mounting mechanism configured to mount the cable organizer on a structure;
   at least one compartment for retaining at least one cable; and
   a set of arms defining at least a portion of the compartment, the set of arms crossing one in front of the other and having a space there between to allow for the cable to be manually guided through the set of arms into the compartment, wherein the cable is retained within the compartment by the crossed arms.

8. A structure comprising:

a rack having a receiving portion; and a cable organizer having:
   a mounting mechanism for mounting the cable organizer to the receiving portion of the rack; and
   a means for retaining a cable in substantially fixed relation to the rack;
   wherein the cable organizer includes a compartment having a cable separator within the compartment, wherein the cable separator is adjustable within the compartment to create compartments of varying size.

* * * * *